United States Patent
Beyabani (10) Patent No.: US 8,607,278 B2
(45) Date of Patent: Dec. 10, 2013

(54) CUSTOMER VOTING ON TIMESLOTS FOR SHOWS

(75) Inventor: Syed Zafar Beyabani, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1016 days.

(21) Appl. No.: 12/272,968

(22) Filed: Nov. 18, 2008

(65) Prior Publication Data

US 2010/0125869 A1  May 20, 2010

(51) Int. Cl.
*G06F 3/00* (2006.01)

(52) U.S. Cl.
USPC .............................................. 725/61

(58) Field of Classification Search
None
See application file for complete search history.

(56) References Cited

U.S. PATENT DOCUMENTS

| | | | |
|---|---|---|---|
| 5,946,052 A * | 8/1999 | Ozkan et al. | 348/555 |
| 2003/0110499 A1* | 6/2003 | Knudson et al. | 725/42 |
| 2003/0227478 A1* | 12/2003 | Chatfield | 345/751 |
| 2004/0172662 A1* | 9/2004 | Danker et al. | 725/135 |
| 2005/0160461 A1* | 7/2005 | Baumgartner et al. | 725/52 |
| 2006/0253869 A1* | 11/2006 | Boyer et al. | 725/51 |
| 2006/0287915 A1 | 12/2006 | Boulet et al. | |
| 2007/0022032 A1* | 1/2007 | Anderson et al. | 705/35 |
| 2007/0094690 A1* | 4/2007 | Rodriguez et al. | 725/58 |
| 2008/0244659 A1 | 10/2008 | Stallings et al. | |
| 2009/0217329 A1* | 8/2009 | Riedl et al. | 725/93 |

* cited by examiner

*Primary Examiner* — Chenea Smith (57) ABSTRACT

A method includes receiving, by a video client, interactive television content that permits a customer to select from two or more television shows competing for a timeslot, displaying, by the video client, the interactive television content on a display, receiving, by the video client, a selection of one of the two or more television shows to watch, and determining, by the video client, based on the interactive television content, whether the one of the two or more television shows selected is to be re-mapped to a channel number that is different than a channel number in which the interactive television content is displayed. The method further includes displaying, by the video client, the one of the two or more television shows on the display.

25 Claims, 9 Drawing Sheets

CUSTOMER VOTING ON TIMESLOTS FOR SHOWS

BACKGROUND

Content providers struggle with selecting time slots for airing television shows, particularly new primetime television shows, since the time when a television show airs can greatly impact the success or failure of the show. Given the number of television shows and available timeslots, content providers may also find it difficult when two or more shows are competing for the same timeslot.

DETAILED DESCRIPTION OF PREFERRED EMBODIMENTS

The following detailed description refers to the accompanying drawings. The same reference numbers in different drawings may identify the same or similar elements. Also, the following description does not limit the invention.

The phrase "television show," as referred to herein, is intended to be broadly interpreted to include, for example, a pilot television show or a television show in its second season, third season, etc.

The concepts described herein relate to allowing customer input in deciding a timeslot for a television show. For example, content providers may offer two or more television shows that customers may select to watch. In one implementation, for example, content providers may provide interactive content (e.g., an overlay) during a timeslot in which the two or more television shows are competing. The interactive content may allow customers to select which television show they would like to watch during that timeslot. When the customers select which of the television shows they would like to watch, the selected television show may be re-mapped (e.g., automatically tuned to) to another channel (e.g., a video-on-demand (VOD) channel). The customers may then watch the selected television show on the other channel. Content providers may track viewership and utilize this information to award the competing timeslot to the television show that attracts the most viewers. It will be appreciated that variations to these concepts will be described below.

Figure 1A:
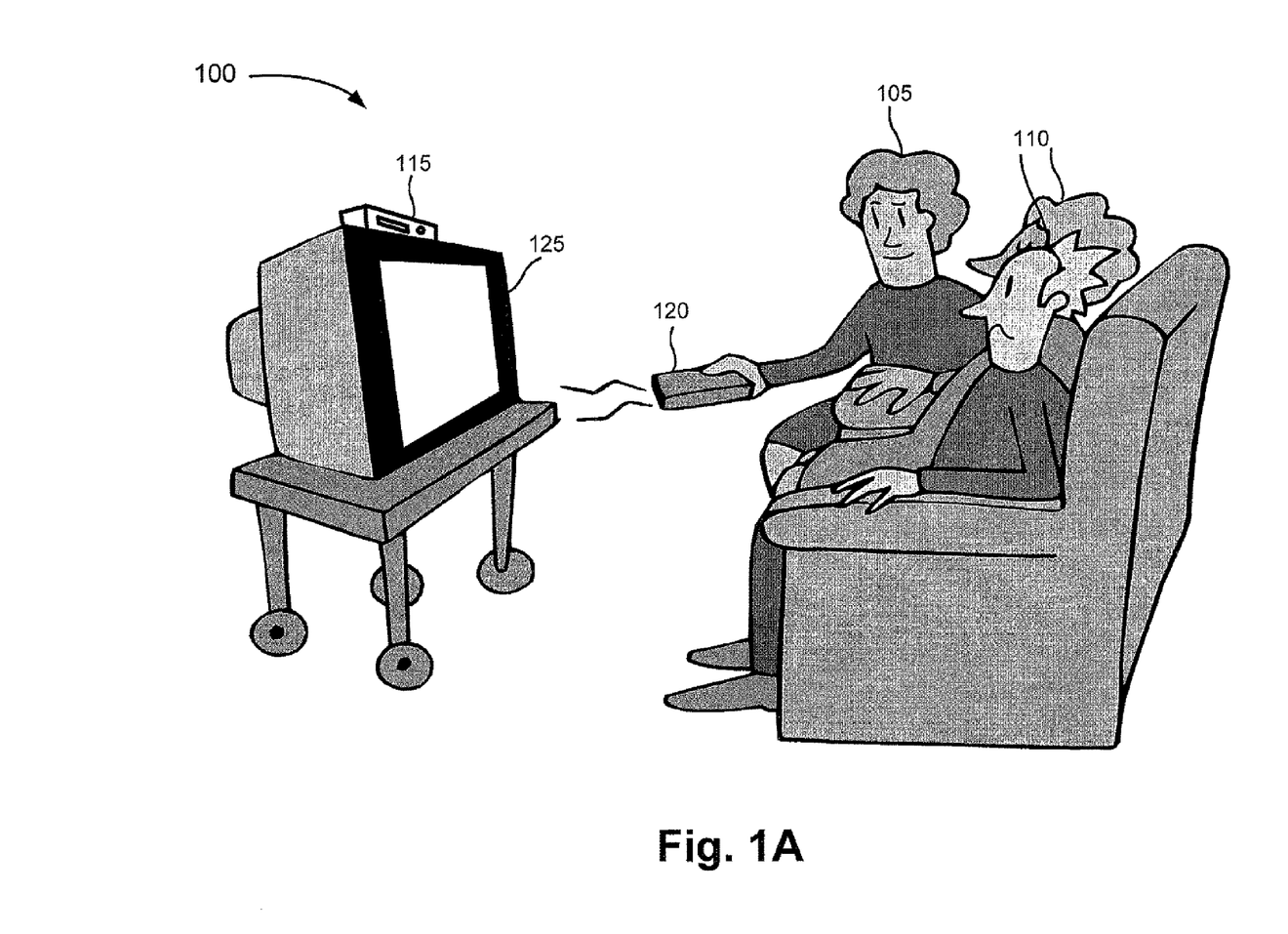
FIGS. 1A and 1B are diagrams illustrating concepts described herein.
Figure 1B:
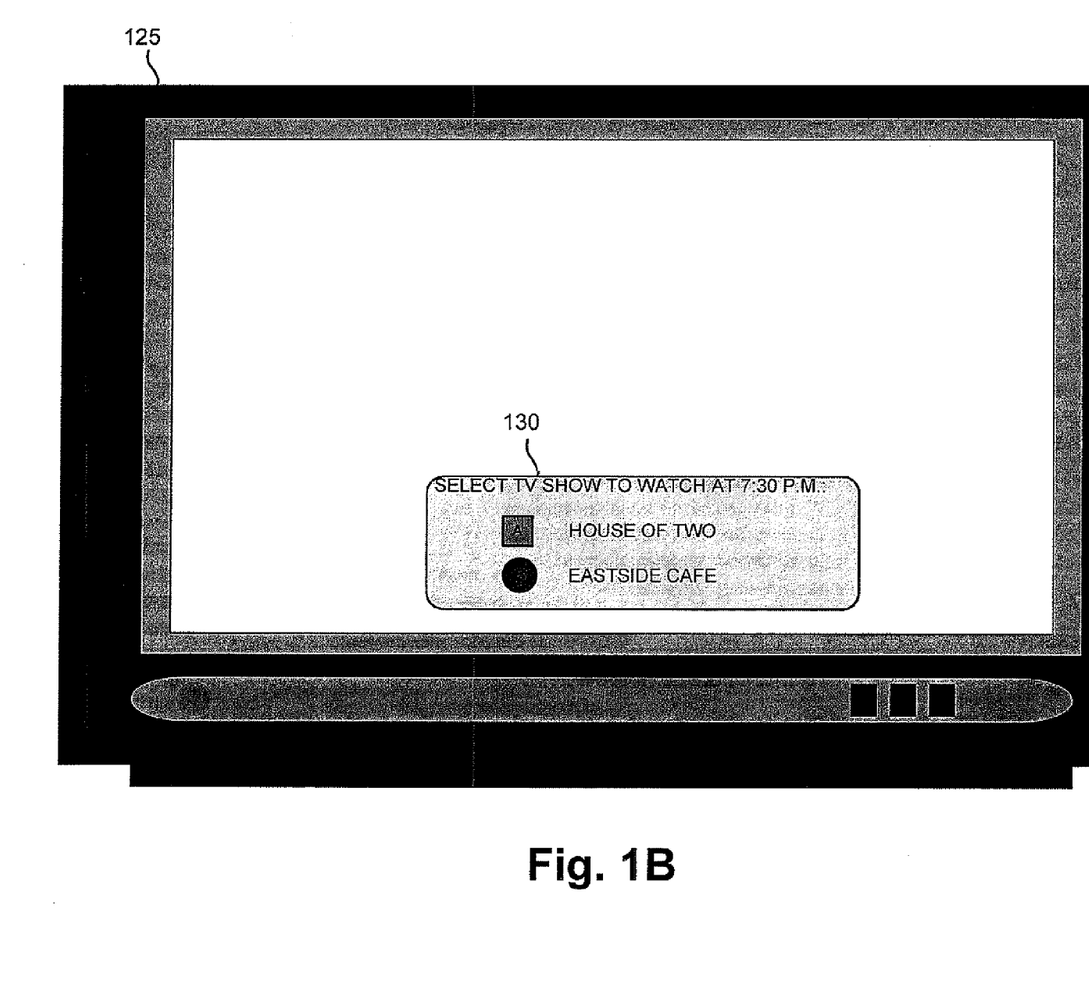

FIGS. 1A and 1B are diagrams illustrating the concepts described herein. As illustrated in FIG. 1A, an exemplary environment 100 may include a user 105, friends 110, a set top box 115, a television remote control 120, and a television 125. For purposes of discussion, assume that user 105 has tuned television 125 to channel 8. Referring to FIG. 1B, user 105 may see a prompt 130 (e.g., an overlay) that allows user 105 to select which television show (e.g., House of Two or Eastside Café) user 105 would like to watch (or record) for a specific timeslot (e.g., 7:30 p.m.). It will be appreciated that in other instances, more than two shows may be presented for selection. User 105 may make a selection by using television remote control 120. Thereafter, set top box 115 may re-map (e.g., automatically tune to) to one of two VOD channels (e.g., channel 900 or channel 901) where user 105 and friends 107 may enjoy the selected television show on television 125. In other embodiments, channel 8 may air one of the televisions shows (e.g., House of Two or Eastside Café) as the default television show for this particular timeslot. In such an instance, when user 105 selects the default television show, set top box 115 may not re-map to a VOD channel.

As a result of the foregoing, content providers may receive customer input on which television show they would like to view during a particular timeslot. Content providers may utilize this information when deciding how to schedule television shows. Since concepts have been broadly described, variations to the above concepts will be discussed further below.

Figure 2:
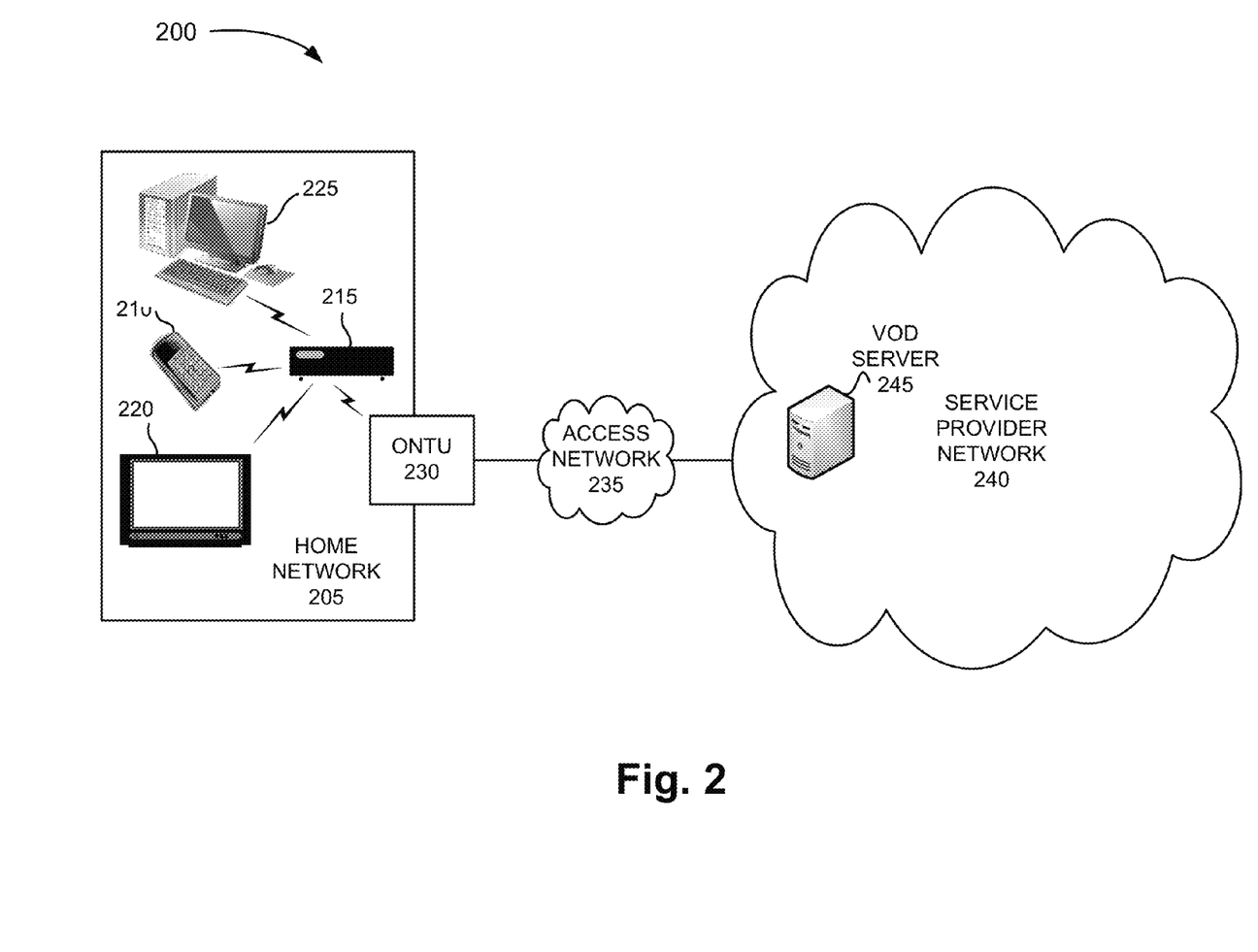
FIG. 2 is a diagram of an exemplary network in which systems and/or methods described herein may be implemented.

FIG. 2 is a diagram of an exemplary network in which systems and/or methods described herein may be implemented. As illustrated, network 200 may include a home network 205, an access network 235, and a service provider network (SPN) 240.

Home network 205 may include a remote control 210, a video client 215, a display 220, a computer system 225, and/or an optical network termination unit (ONTU) 230. Remote control 210 may include a device capable of remotely controlling the operation of video client 215 and/or display 220. Remote control 210 may transmit signals, such as, for example, infrared signals, to a signal receiver associated with video client 215 and/or display 220.

Video client 215 may include a device capable of receiving, transmitting and/or processing (e.g., encoding, decoding, encrypting, decrypting, etc.) information to and from access network 235. Video client 215 may provide video signals to display 220. In some instances, video client 215 may provide multi-room service. For example, video client 215 may communicate (e.g., video signals, television screenshots, music, etc.) with display 220, computer system 225, and/or other video clients and/or displays (not illustrated), etc., in home network 205. Video client 215 may include a digital video recorder (DVR) (e.g., a hard drive). Video client 215 may be capable of receiving input from a user directly (e.g., a button on video client 215) or indirectly (e.g., via remote control 210). In one implementation, video client 215 may include a set top box (STB). In another implementation, video client 215 may include a computer device, a cable card, a television tuner card, a stationary device (e.g., a telephone or a computer), or a portable device (e.g., a mobile telephone, a personal digital assistant (PDA), an Internet-based device). Video client 215 may include components, to be described below, for allowing customer input in deciding a timeslot for a television show.

Display 220 may include a device capable of receiving and reproducing video signals. In one implementation, display 220 may include a television. In other implementations, display 220 may include, for example, a display of a stationary communication device (e.g., a computer or a telephone), a display of a portable or a handheld communication device (e.g., a mobile telephone, a PDA, an Internet-based device, or a laptop computer), or a display associated with a vehicle-based communication system. Display 220 may connect to video client 215 in a wired or wireless manner.

Computer system 225 may include a computational device, such as a desktop computer, a laptop computer, etc., that may further include peripheral devices (e.g., a display, a mouse, a keyboard, etc.). Computer system 225 may include one or more components for communicating with video client 215. Computer system 225 may connect to video client 215 in a wired or wireless manner.

ONTU 230 may include a device capable of providing an interface between home network 205 and access network 235. For example, ONTU 230 may convert optical signals to electrical signals and vice versa, as well as other functions, such as multiplexing, demultiplexing, encoding, decoding, modulating, demodulating, etc. ONTU 230 may include channel plug-in units that provide a narrowband interface to customer premises equipment in home network 205. ONTU 230 may also connect to access network 235 (e.g., to central office (CO) equipment).

Access network 235 may include a video signaling and distribution network. Access network 235 may include, among other things, firewall, filtering, proxy, and/or network address translation mechanisms. Access network 235 may include, for example, any type of network, such as a wide area network (WAN), a local area network (LAN), a telephone network (e.g., a public switched telephone network (PSTN) or a wireless network), the Internet, a satellite network, etc., or a combination of the above networks (or other networks). Access network 235 may communicatively couple home network 205 and SPN 240.

SPN 240 may include a video signaling and distribution network. For example, SPN 240 may include broadcast systems and content for distribution, such as video-on-demand (VOD), an interactive program guide (IPG), regional content, and national content.

VOD may include content such as movies, television programs, sports programs, special interest programs, and/or educational programs that may be viewed by a customer upon request (i.e., on-demand). In one embodiment, SPN 240 may include a VOD server 245. VOD server 245 may provide VOD content to customers. VOD server 245 may include components, to be described below, for allowing customer input in deciding a timeslot for a television show.

IPG may include, for example, a listing and/or a schedule of programs available for viewing. Regional content may include, for example, news programs, independent channel programming, movies, sports programs, religious programs, music, and/or commercials. National content may include, for example, television programs, movies, premier channel programming, news programs, sports, religious programs, music, and/or commercials.

Although FIG. 2 illustrates an exemplary network 200, in other implementations, network 200 may include additional, fewer, or different devices, or differently arranged devices and/or network(s). For example, network 200 may include video offices, super head ends, and/or other types of devices that support video distribution, video signaling, etc. It will be appreciated that the connections between the devices and/or the networks are exemplary. Additionally, or alternatively, it will be appreciated that one or more functions described as being performed by a particular device of network 200 may be performed by another device(s) or network 200, or in combination therewith. For example, one or more functions, to be described below, with respect to VOD server 245, may be performed by other devices that support video distribution and/or video signaling, or in combination with VOD server 245.

Figure 3:
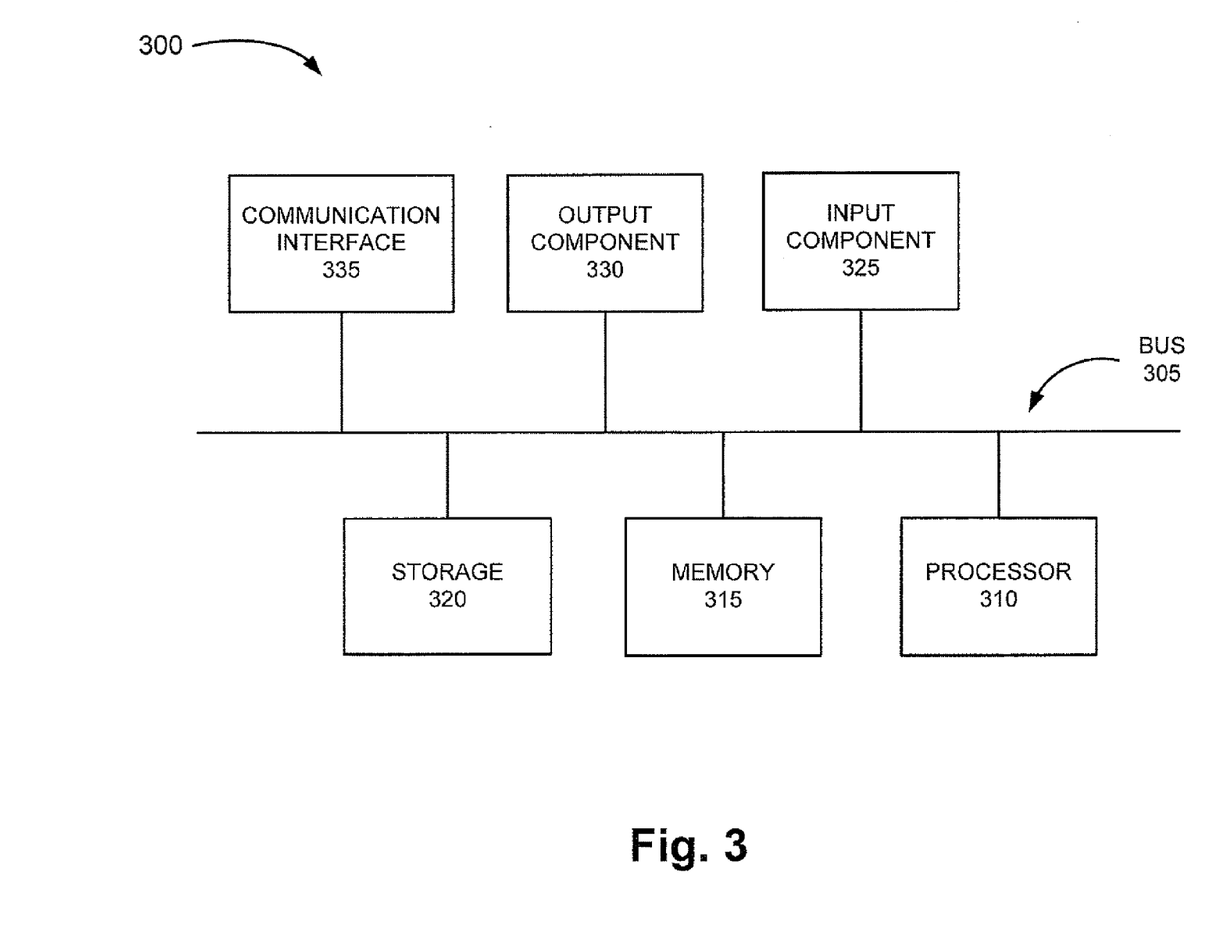
FIG. 3 is a diagram illustrating exemplary components of a device that may correspond to one or more of the exemplary devices depicted in FIGS. 1A, 1B and 2.

FIG. 3 is a diagram illustrating exemplary components of a device 300 that may correspond to one or more of the exemplary devices in network 200. For example, device 300 may correspond to video client 215, VOD server 245, etc., of FIG. 2. As illustrated, device 300 may include a bus 305, a processor 310, a memory 315, storage 320, an input component 325, an output component 330, and/or a communication interface 335.

Bus 305 may include a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 may interpret and/or executes instructions and/or data. For example, processor 310 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 315 may store data, an application, and/or instructions related to the operation of device 300. For example, memory 315 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 320 may store data, an application(s) and/or instructions related to the operation of device 300. For example, storage 320 may include a hard disk (e.g., a magnetic disk, an optical disk, a magneto-optic disk, etc.) or another type of computer-readable medium, along with a corresponding drive. The term "computer-readable medium" is intended to be broadly interpreted to include a physical or a logical memory device. Memory 315 and/or storage 320 may also include a storing device external to and/or removable from device 300, such as a Universal Serial Bus (USB) memory stick, a hard disk, etc.

Input component 325 may permit a user and/or another component to input information in device 300. For example, input component 325 may include a keyboard, a keypad, a touch screen, a touchpad, a mouse, a button, a switch, a microphone, an input port, voice recognition logic, and/or some other type of visual and/or auditory input component. Output component 330 may permit device 300 to output information to a user and/or another component. For example, output component 330 may include a display, a speaker, one or more light emitting diodes (LEDs), an output port, a vibrator, and/or some other type of visual, auditory, and/or tactile output component.

Communication interface 335 may enable device 300 to communicate with other components and/or systems. For example, communication interface 335 may include an Ethernet interface, an optical interface, a coaxial interface, a radio interface, or the like that permits device 300 to communicate with devices and/or networks in environment 200.

Although FIG. 3 illustrates exemplary components, in other implementations, device 300 may include additional, fewer, or different components, or differently arranged components.

Figure 4:
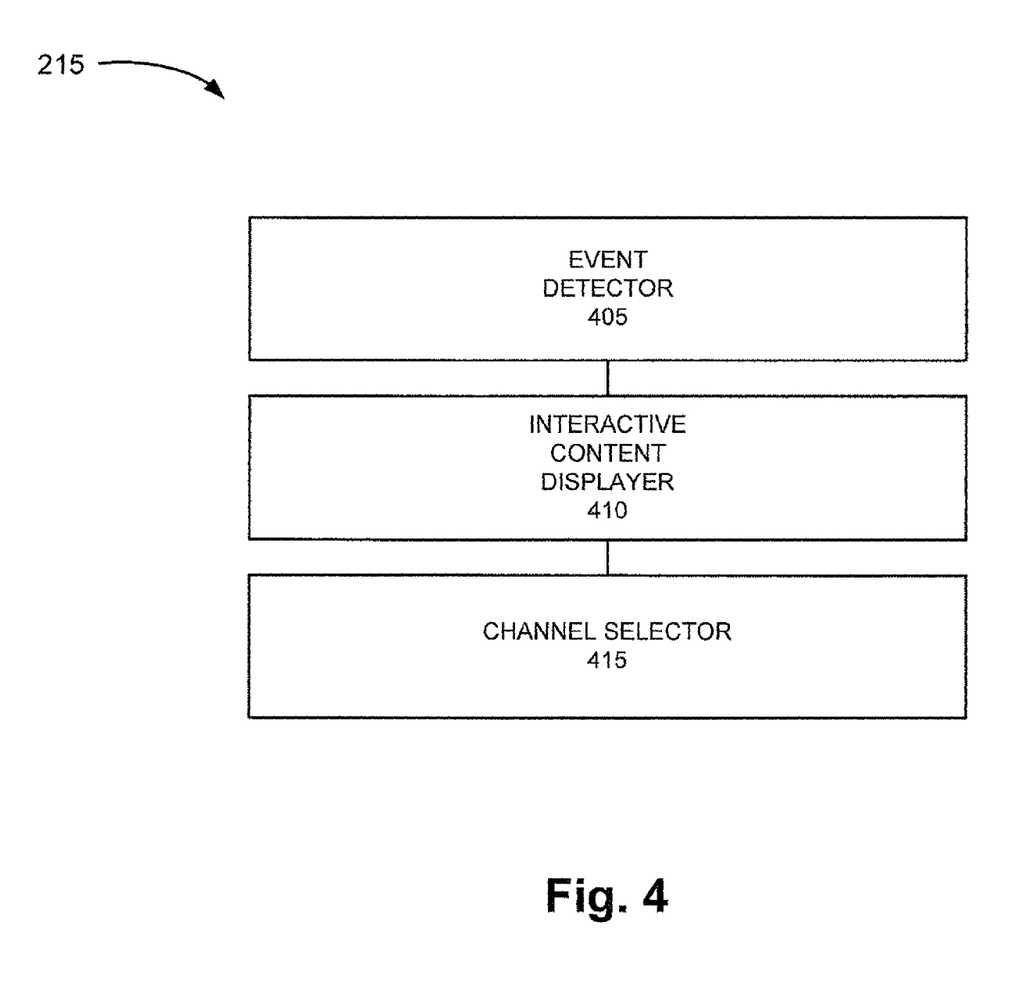
FIG. 4 is a diagram of exemplary functional components of the video client.

FIG. 4 is a diagram of exemplary functional components of video client 215. As illustrated, video client 215 may include an event detector 405, an interactive content displayer 410, and a channel selector 415. Event detector 405, interactive content displayer 410 and channel selector 415 may be implemented as, for example, hardware (e.g., processor 310) or as a combination of hardware and software (e.g., processor 310, memory 315, storage 320).

Event detector 405 may monitor for, and detect interactive content in, a video stream. For example, the interactive content may include an Enhanced TV Binary Interchange Format (EBIF) script. In such an instance, event detector 405 may include a user agent that detects enhanced television (ETV) binary commands. In other embodiments, the interactive content may comport to other specifications or formats (e.g., OpenCable Application Platform (OCAP)).

Interactive content displayer 410 may interpret and display the interactive content. Interactive content displayer 410 may include a user agent that interprets ETV binary commands via an in-band video stream. The interactive content may permit a customer to select a television show to watch that would not otherwise be available during a particular timeslot. The interactive content may include channel information associated with each television show to which a customer may select.

Channel selector 415 may automatically tune to a channel associated with a particular television show that is selected from the interactive content. Channel selector 415 may also report to SPN 240 (e.g., VOD server 245) the television show selected. As will be described below, this reporting may be used to tally results of customers' selections and report these results to the content provider.

Although FIG. 4 illustrates exemplary functional components, in other implementations, fewer, additional, different, or differently arranged components than those illustrated in FIG. 4 may be employed. Additionally, or alternatively, one or more of the functions described as being performed by one of the functional components may be performed by another one of the functional components.

Figure 5:
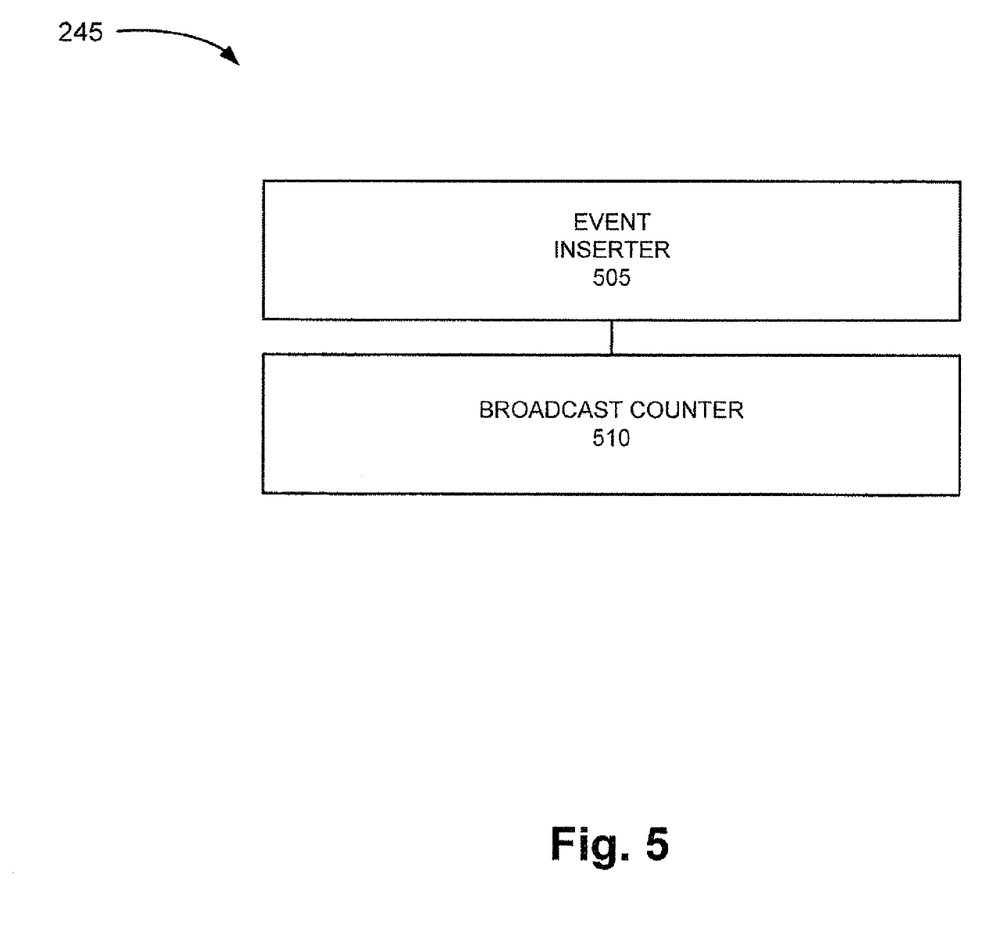
FIG. 5 is a diagram of exemplary functional components of the VOD server.

FIG. 5 is a diagram of exemplary components of VOD server 245. As illustrated, VOD server 245 may include an event inserter 505 and a broadcast counter 510. Event inserter 505 and broadcast counter 510 may be implemented as, for example, hardware (e.g., processor 310) or as a combination of hardware and software (e.g., processor 310, memory 315, storage 320).

Event inserter 505 may insert interactive content in a video stream. For example, the interactive content may include an EBIF script. The interactive content may permit a customer to select a television show to watch that would not otherwise be available during a particular timeslot. The interactive content may include channel information associated with each television show to which a customer may select.

Broadcast counter 510 may tally results of customers' selections of television shows for a particular timeslot. For example, broadcast counter 510 may tally results of television shows that have been re-mapped to a VOD channel. In instances where a selected television show is not re-mapped on a VOD channel, video client 215 may transmit selection information to VOD server 245. Broadcast counter 510 may provide these results to a content provider.

Although FIG. 5 illustrates exemplary functional components, in other implementations, additional, different, or differently arranged components than that illustrated in FIG. 5 may be employed. Additionally, or alternatively, one or more of the functions described as being performed by the functional components may be performed by another component of VOD server 245.

Described below is an exemplary process for allowing customer input in deciding a timeslot for a television show. The process will be described as being performed by devices in network 200.

Figure 6:
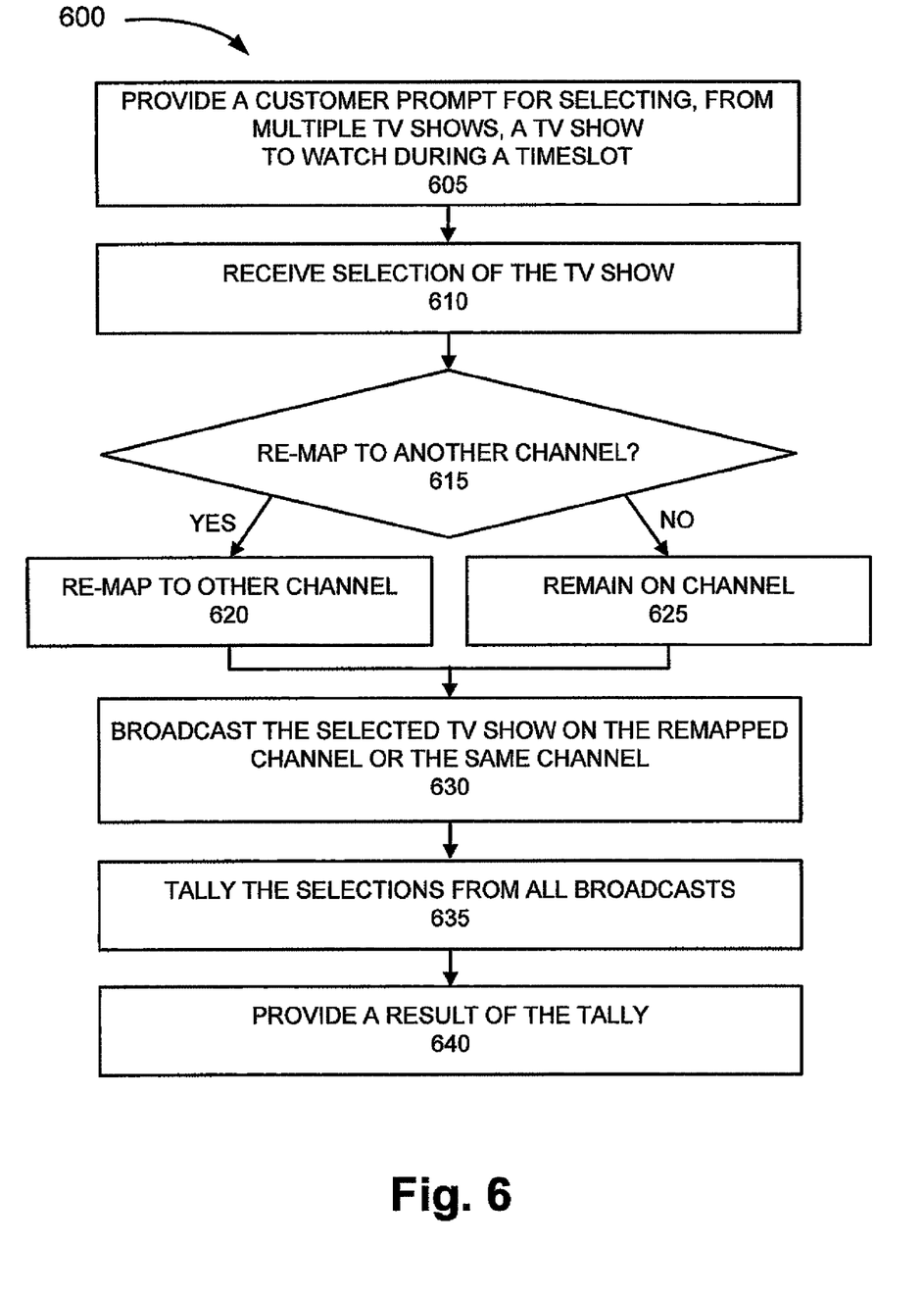
FIG. 6 is a flow diagram illustrating an exemplary process for allowing customer input in deciding a timeslot for a television show.

FIG. 6 is a flow diagram illustrating an exemplary process 600 for allowing customer input in deciding a timeslot for a television show. In addition to FIG. 6, process 600 may be described in reference to other figures.

Figure 7:
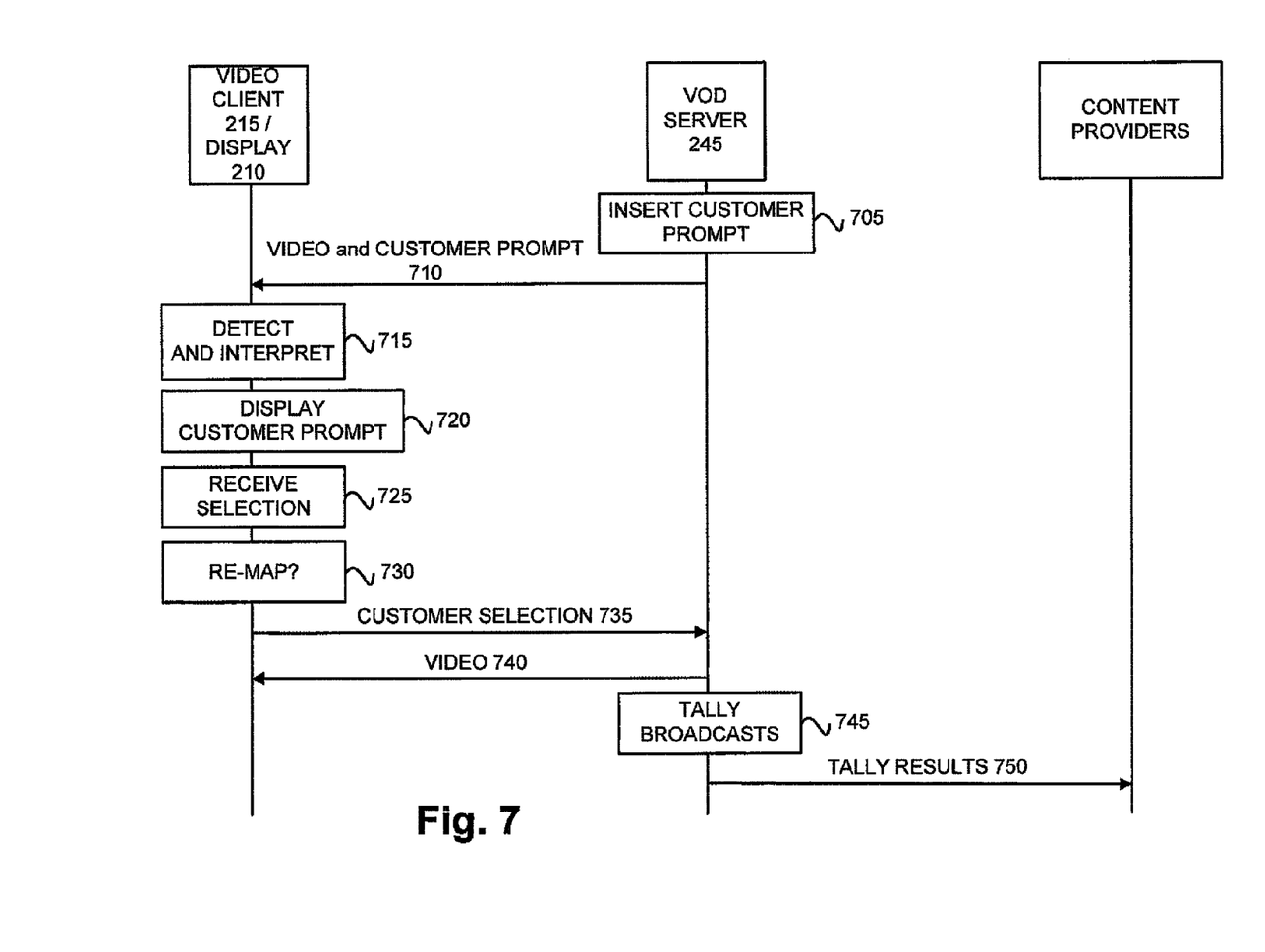
FIG. 7 is a diagram illustrating exemplary messages associated with the process of FIG. 6.

Process 600 may begin with providing a customer prompt for selecting, from multiple television shows, a television show to watch during a timeslot (block 605). For example, FIG. 7 is a diagram illustrating exemplary messages associated with process 600 of FIG. 6. As illustrated, VOD server 245 (e.g., event inserter 505) may insert a customer prompt 705 into a video stream. Customer prompt 705 may include interactive content that permits a customer to select a television show, from multiple television shows, to watch during a particular timeslot. Customer prompt 705 may include an EBIF script. Customer prompt 705 may include other parameters, such as, channel information, associated with each television show, so that video client 215 may automatically tune into the appropriate channel once a selection has been received.

As further illustrated in FIG. 7, VOD server 245 may transmit a video and customer prompt 710 to video client 215. In one embodiment, the video may correspond to a television show from which a customer may select via customer prompt 705. In other embodiments, the video may correspond to a television show that is not one from which a customer may select via customer prompt 705. As further illustrated in FIG. 7, video client 215 may receive video and customer prompt 710. Video client 215 may then detect and interpret 715 customer prompt 705 and display customer prompt 720 to a customer. For example, event detector 405 of video client 215 may detect and interpret customer prompt 705, and interactive content displayer 410 of video client 215 may display customer prompt 705 on display 220.

Figure 8:
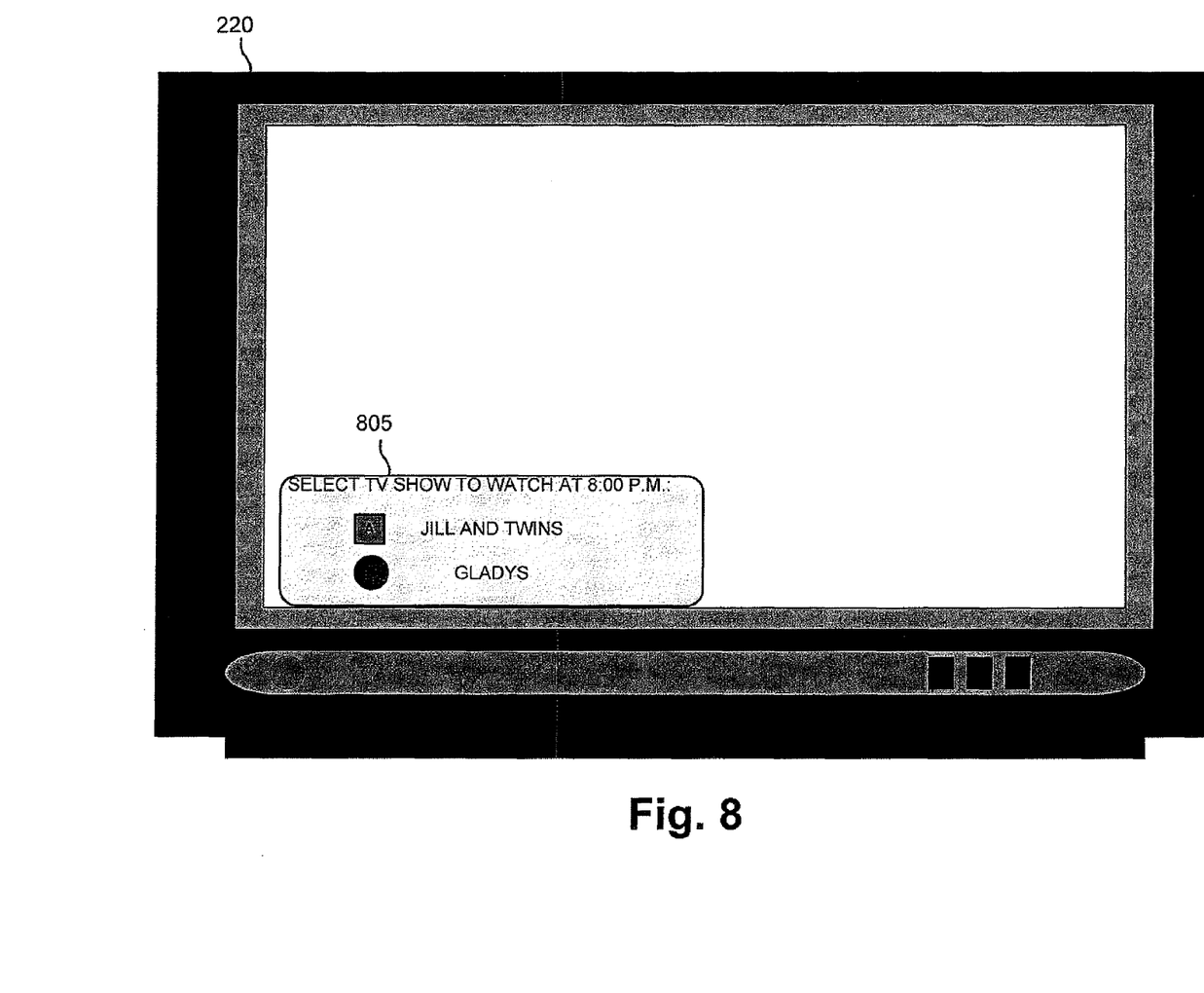
FIG. 8 is a diagram illustrating an exemplary customer prompt for selecting a television show to watch.

A selection of the television show may be received (block 610). Video client 215 may receive a selection of one of the multiple television shows presented to a customer via the customer prompt. FIG. 8 is a diagram illustrating an exemplary customer prompt for selecting a television show to watch. For example, as illustrated in FIG. 8, assume that customer prompt 705 (e.g., an overlay) allows a customer to select from two television shows, namely, "Jill and Twins" and "Gladys." In other instances, the customer may select from more than two television shows. A customer may select one of these two television shows by entering the appropriate selection on remote control 210. For example, a customer may press a button "A" or a button "B" to select which television show to watch for a particular time slot. The customer's selection may be received by video client 215 (e.g., as illustrated as receive selection 725 in FIG. 7).

A determination may be made whether to re-map to another channel (block 615). Video client 215 (e.g., channel selector 415) may determine whether to re-map (e.g., automatically tune to) to another channel (i.e., a channel that is different than the channel which customer prompt 705 is provided), as illustrated by re-map 730 in FIG. 7. Video client 215 may make this determination based on information associated with customer prompt 705. For example, returning to FIG. 8, assume that the television show named "Jill and Twins" is assigned to channel ten and the television show named "Gladys" is assigned to another channel (e.g., channel 901, a VOD channel). Also assume that "Jill and Twins" is the default television show scheduled on channel ten and that customer prompt 705 was displayed to a customer at the beginning of a timeslot (e.g., 8:00 p.m.) on channel ten. In such a case, when the customer selects the television show named "Gladys," video client 215 may determine whether to re-map to another channel (block 615-YES), and may then re-map to another channel (e.g., channel 901) (block 620). On the other hand, when the customer selects the television show named "Jill and Twins," video client 215 may determine not to re-map to another channel (block 615-NO), and remain on the current channel (block 625). It will be appreciated that other scenarios may be implemented. For example, assume a television show not offered for selection is scheduled at a timeslot (e.g., 7:30 p.m.) on channel ten, but that customer prompt 705 was displayed on channel ten. In such a case, when the customer selects the television show named "Jill and Twins" or "Gladys," video client 215 may determine to re-map to another channel (block 615—YES), and may re-map to another channel (e.g., channel 900 for Jill and Twins or channel 901 for Gladys) (block 620). In another scenario, assume that the television show named "Jill and Twins" is the default television show scheduled at a timeslot (e.g., 7:30 p.m.) on channel ten and the television show named "Gladys" is the default television scheduled at another timeslot (e.g., 8:00 p.m.) on channel ten. In such an instance, customer prompt 705 may be provided to a customer at both times. In this way, the customer may select an order of the television shows and their respective timeslots. In this regard, the process of re-mapping a television show to a particular channel may be different depending on the timeslot.

The selected television show on the re-mapped channel or the same channel may be broadcasted (block 630). Video client 215 may transmit a customer selection 735 to VOD server 245. VOD server 245 (or some other device in SPN 240) may provide video client 215 with the selected video 740 for broadcast on the re-mapped channel or the same channel.

The selections from all the broadcasts may be tallied (block 635). VOD server 245 (e.g., broadcast counter 510) may tally broadcasts 740 based on the customers' selections of the television shows and their corresponding broadcasting. For example, when the selected television show is re-mapped to a VOD channel, broadcast counter 510 may obtain this information and tally the broadcast. However, in instances where the selected television show is not re-mapped to a VOD channel, then video client 215 may transmit the customer's selection (i.e., which television show was selected) to VOD server 245.

The result of the tally may be provided (block 640). VOD server 245 may transmit tally results 745 to content providers, as illustrated in FIG. 7. Content providers may utilize this information for selecting timeslots for television shows.

Although FIG. 6 illustrates an exemplary process 600, in other implementations, fewer, additional, or different operations may be performed.

According to the concepts described herein, customers may be allowed to select one television show over another for a timeslot. The customers' selections may be tallied to assist content providers in assigning timeslots to television shows that yield the most viewership.

The foregoing description of implementations provides illustration, but is not intended to be exhaustive or to limit the implementations to the precise form disclosed.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks has been described with regard to the process illustrated in FIG. 6, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    providing, by one or more devices and to a video client, interactive television content that includes first information and second information,
        the first information indicating that a first television show is scheduled to be provided for display during a first time slot, and
        the second information indicating that a second television show is scheduled to be provided for display during a second time slot that occurs after the first time slot;
    receiving, by the one or more devices and from the video client, information identifying a particular selection, by a particular viewer, for the second television show to be provided for display during the first time slot;
    determining, by the one or more devices and based on the particular selection, a first quantity of selections for the second television show to be provided for display during the first time slot;
    providing, by the one or more devices and to a content provider associated with the second television show, information based on the first quantity of selections,
        the content provider using the information based on the first quantity of selections to determine whether to schedule to provide the second television show during the first time slot.

2. The method of claim 1, where the video client includes a set top box.

3. The method of claim 1, where providing the information based on the first quantity of selections comprises:
    determining a second quantity of selections for the first television show to be provided for display during the first time slot;

determine, based on the first quantity of selections and the second quantity of selections, a result that indicates that the second television show was selected more times than the first television show for the first time slot,
the information based on the first quantity of selections including the result; and
providing the result to the content provider for the content provider to use the result to determine whether to provide the second television show during the first time slot.

4. The method of claim 1, further comprising:
transmitting, to the video client and based on the particular selection, the second television show for display during the first time slot.

5. The method of claim 1, where providing the interactive television content includes:
inserting the interactive television content into a video stream, and
providing the video stream to the video client.

6. The method of claim 1, further comprising:
determining, based on the particular selection, that the second television show is to be re-mapped to a first channel number that is different from a second channel number,
the second channel number corresponding to a channel on which the interactive television content is displayed during the first time slot; and
providing the second television show via a channel corresponding to the first channel number.

7. The method of claim 5, where the video stream includes at least one of the first television show or the second television show.

8. The method of claim 6, where the channel corresponding to the first channel number is a video-on-demand channel.

9. The method of claim 1, further comprising:
determining a second quantity of selections, by a plurality of viewers, for the first television show to be provided during the first time slot,
the information based on the first quantity of selections being further based on the second quantity of selections, and
the content provider scheduling to provide the first television show during the first time slot on a particular channel when the first quantity of selections is greater than the second quantity of selections.

10. A system comprising:
one or more processors to:
provide, to a video client, interactive television content that includes first information and second information,
the first information indicating that a first television show is scheduled to be provided during a first time slot, and
the second information indicating that a second television show is scheduled to be provided during a second time slot that follows the first time slot;
receive, from the video client, information identifying a particular selection, by a particular viewer, for the second television show to be provided during the first time slot;
determine, based on the particular selection, a first quantity of selections for the second television show to be provided during the first time slot; and
provide, to a content provider associated with the second television show, information based on the first quantity of selections,
the content provider using the information based on the first quantity of selections to determine whether to schedule to provide the second television show during the first time slot.

11. The system of claim 10, where, when providing the interactive television content, the one or more processors are to:
provide, to the video client, a video stream that includes the interactive television content.

12. The system of claim 11,
where the system includes a video-on-demand server to provide the second television show during the first time slot based on the particular selection, and
where the video client includes a set top box.

13. The system of claim 11, where the one or more processors are further to:
determine a second quantity of selections for the first television show to be provided during the first time slot,
the information based on the first quantity of selections being further based on the second quantity of selections.

14. The system of claim 10,
where the interactive television content includes a plurality of channel numbers,
where a first channel number, of the plurality of channel numbers, corresponds to a first channel that is associated with the first television show, and
where a second channel number, of the plurality of channel numbers, corresponds to a second channel that is associated with the interactive television content.

15. The system of claim 11, where the video client is to:
determine that the video stream includes the interactive content;
interpret enhanced television binary commands included in the interactive television content; and
provide, for display, the interactive television content based on interpreting the enhanced television binary commands.

16. The system of claim 10, where the content provider is to schedule to provide the second television show during the first time slot when the first quantity of selections is greater than a second quantity of selections for the first television show to be provided during the first time slot.

17. A non-transitory computer-readable medium storing instructions, the instructions comprising:
one or more instructions which, when executed by a processor, cause the processor to:
provide interactive content that includes first information and second information,
the first information indicating that a first television show is scheduled to be provided during a first time slot, and
the second information indicating that a second television show is scheduled to be provided during a second time slot that is different from the first time slot;
receive information identifying a particular selection, by a particular viewer, for the second television show to be provided during the first time slot;
determine, based on the particular selection, a first quantity of selections for the second television show to be provided during the first time slot; and
provide, to a content provider associated with the second television show, information based on the first quantity of selections, the content provider using the first quantity of selections to determine whether to schedule to provide the second television show during the first time slot.

18. The non-transitory computer-readable medium of claim 17,
where the interactive content further includes an Enhanced TV Binary Interchange Format (EBIF) script,
where the interactive content is provided to a video client, and
where the video client provides the interactive content for display during the first time slot and the second time slot based on the EBIF script.

19. The non-transitory computer-readable medium of claim 18,
where the EBIF script includes two or more channel numbers corresponding to the first television show and the second television show, and
where a particular channel number, of the two or more channel numbers, corresponds to the second television show and is associated with a channel on which the interactive content is displayed.

20. The non-transitory computer-readable medium of claim 17, where the content provider is to schedule to provide the second television show during the first time slot when the first quantity of selections is greater than a second quantity of selections for the first television show to be provided during the first time slot.

21. A method comprising:
inserting, by one or more devices, interactive television content into a video stream,
the interactive television content containing first information and second information,
the first information indicating that a first television show is scheduled to be provided during a first time slot on a first channel, and
the second information indicating that a second television show is scheduled to be provided during a second time slot on a second channel;
transmitting, by the one or more devices, the video stream;
receiving, by the one or more devices, a response that indicates a selection for the second television show to be provided during the first time slot;
determining, by the one or more devices and based on the response, a quantity of selections for the second television show to be provided for display during the first time slot; and
providing, by the one or more devices and to a content provider associated with the second television show, information based on the quantity of selections,
the content provider using the information based on the quantity of selections to determine whether to select to schedule to provide the second television show during the first time slot on the first channel.

22. The method of claim 21, where the one or more devices include a video-on-demand server.

23. The method of claim 21, further comprising:
receiving a plurality of responses from a plurality of customers,
the plurality of responses including information identifying selections to provide the first television show or the second television show during the first time slot, and,
the plurality of responses including the response, and
the information based on the quantity of selections being further based on other information included in the plurality of responses.

24. The method of claim 21, where the second channel corresponds to a video-on-demand channel.

25. The method of claim 21, where the content provider is to schedule to provide the second television show during the first time slot when the quantity of selections is greater than a different quantity of selections for the first television show to be provided during the first time slot.

* * * * *